Jan. 4, 1949.  E. M. SMITH  2,458,436
SPLIT-PHASE INDUCTION MOTOR
Filed Sept. 29, 1944
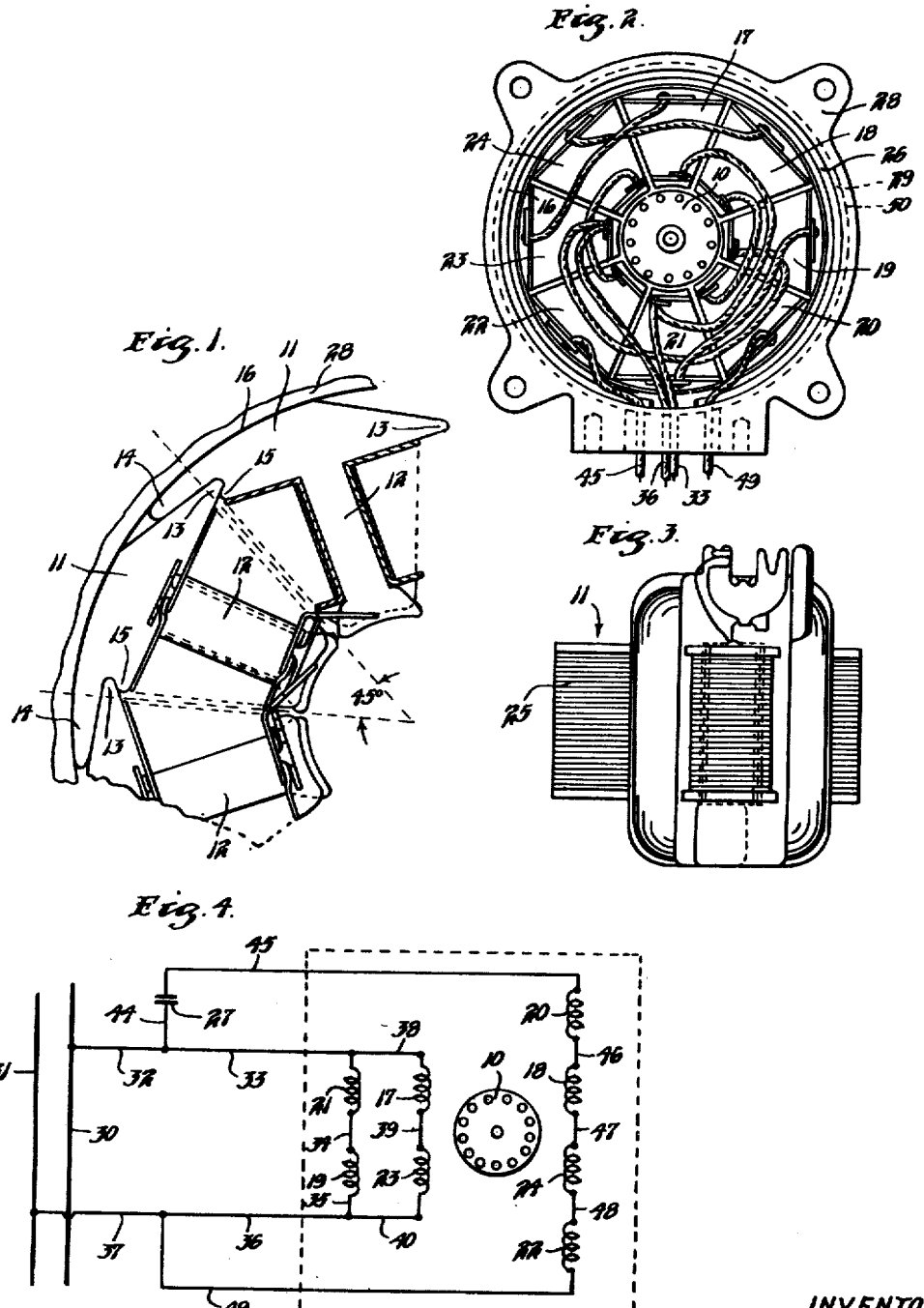
INVENTOR
EDGAR M. SMITH
BY George H. Fisher
ATTORNEY Patented Jan. 4, 1949

2,458,436

UNITED STATES PATENT OFFICE 2,458,436

SPLIT-PHASE INDUCTION MOTOR

Edgar M. Smith, Trenton, N. J., assignor to The Minneapolis-Honeywell Regulator Company, Minneapolis, Minn., a corporation of Delaware Application September 29, 1944, Serial No. 556,343

4 Claims. (Cl. 318—220)

The present invention relates to induction motors and more specifically to capacitor run motors operating from a single phase source of E. M. F. and to improvements in the arrangements of electrical parts to provide maximum efficiency and torque while maintaining economy of construction, facility of assembly, and simplicity of production line methods.

Such motors employ a capacitor to effect substantially a ninety degree shift in one of two sets of operating field windings to operate effectively as a two-phase motor. It is well known that if two or more periodically changing magnetic fields are used to produce a revolving field for the operation of a motor induction type, the optimum condition is one that will produce a revolving field of constant velocity and amplitude through the full 360 degrees of rotation. In standard multiphase motors this problem does not present any real difficulties of solution, but in induction or synchronous types of motors, such as a condenser type motor, which operate as a two-phase motor from a single phase source, the necessary shifting of the line phase creates conditions of undesirable amplitude or phase consideration, from which fact a compromise is usually selected in order to avoid expensive construction, or optimum production design is sacrificed to provide maximum torque, synchronism pull-out, and so forth. Many schemes to effect an arrangement of this sort, i. e., the operation of a two phase motor from a single phase source, have been provided, but it is believed that the arrangement comprising my invention accomplishes this in a novel maner and holds certain advantages to methods known in the art.

In the present invention, the conditions producing an ideal revolving field are controlled by means which afford uniformity to production methods by providing similar physical characteristics for all of the duplicated elements, thereby enabling inexpensive construction of the type of motor involved, at the same time providing a motor of maximum torque and efficiency.

It is an object of my invention to provide an improved motor of the capacitor run type in which the stator comprises a plurality of windings of an equal number of turns and equal resistance and which is compact and of inexpensive construction by virtue of duplication of parts.

Further objects of my invention will become apparent from a study of the accompanying specification and drawings, of which Figures 1, 2, and 3 are views of a preferred type of motor construction, and Figure 4 is a schematic drawing of my motor showing the manner in which the electrical elements thereof are connected together.

Referring to the accompanying drawings, Figures 1, 2, and 3 show the structure of a motor of preferred design incorporating the invention (the selected motor as far as its physical construction is concerned corresponding to the patent of Walter E. Edelman, No. 2,412,254). In these figures, the reference numeral 10 is employed to indicate a rotor of conventional squirrel cage construction. The rotor is associated with a stator comprising a plurality of interlocked stator sections 11. Each stator section 11 comprises a plurality of laminations 25 assembled in stacked relation and is provided with a pole portion 12, a tongue portion 13 and a pair of lip portions 14 and 15. The tongue portion 13 of any one stator section 11 is adapted to fit between the lip portions 14 and 15 to maintain each stator section in a desired position relative to its adjacent stator sections. The various stator sections are held together radially by the inside surface 16 of the motor casing 26 and transversely by means of a heel portion (not shown) at one end which remains after machining surface 16 to a predetermined depth, and a retainer ring 28 at the other end which fits into a grove 29, the depth of which is shown by invisible line 58. In the particular embodiment shown in Figs. 1 to 3, there are eight such stator sections. Surrounding the pole portion 12 of each stator section 11 is a winding generally conical in form. These windings are designated in the drawings by reference numerals 17 to 24.

It will become readily apparent from the structural arrangements of Figures 1 to 3 that it is highly desirable that the windings 17 to 24 be of uniform dimensions. If, however, the same number of equal resistance windings are connected in series in both the capacitor phase and line phase, the voltage drop per winding across the windings of the capacitor phase will be much higher than the voltage drop per winding across the windings of the line phase. This condition of unequal voltage drop per winding is a common difficulty encountered when employing a capacitive reactance to provide substantially a 90 degree shift in phase in one of the sets of windings relative to the other set of windings and is due to the fact that the optimum choice of capacitance to provide this phase shift usually offers sufficient capacitive reactance in series with the capacitor phase windings to bring the circuit to, or substantially near to, resonance and thereby create relatively high voltages across the inductive and capacitive components of the capacitor phase. As a result, it has been suggested in the past to employ a different number of turns of different resistance in the capacitor phase windings than in the line phase windings as a compromise to effect optimum conditions of phase and voltage. This obviously leads to non-uniformity in the parts and complicates the assembly of the motor.

Referring to Figure 4, I have shown schematically the arrangement of my motor in the manner in which various windings are so interconnected to permit the use of identical windings throughout. In this figure, the reference numerals correspond to those previously employed in connection with Figures 1 to 3. The capacitor is designated by the reference numeral 27. The dotted line 28 is employed to enclose the elements of the motor proper, as distinguished from the capacitor associated with the motor. Power is supplied to the motor by line wires 30 and 31 leading to any suitable source of power (not shown).

The windings 21 and 19 are connected directly across line wires 30 and 31 in a circuit as follows: from line wire 30 through conductors 32 and 33, winding 21, conductor 34, winding 19, and conductors 35, 36, and 37 back to line wire 31. The windings 17 and 23 are connected in parallel with windings 21 and 19 across the line wires 30 and 31 by conductors 38, 39, and 40.

Referring now to the capacitor phase, the windings 20, 18, 24, and 22 are connected in series with capacitor 27 in a circuit as follows: from line wire 30 through conductors 32 and 44, capacitor 27, conductor 45, winding 20, conductor 46, winding 18, conductor 47, winding 24, conductor 48, winding 22, and conductors 49 and 37, back to line wire 31.

It will be noted from the above that there are four windings in series between the line wires 31 and 31 in the capacitor phase. In the main or line phase, on the other hand, there are four windings but there are only two windings which are in series with each other between the line wires. Thus, half of the voltage across line wires 30 and 31 is impressed across each of the four windings of the line or main phase. In the capacitor phase, on the other hand, if it were not for the capacitor 27, only one-fourth of the line voltage would be impressed across each of the windings 20, 18, 24, and 22. As explained above, however, the presence of capacitor 27 results in the voltage across the series connected windings 20, 18, 24, and 22 being very much higher than that across line wires 30 and 31. The relative voltage drop across the windings in the capacitor phase and that between the line wires is dependent upon the circuit constants of the motor, such as the value of the combined inductance of windings 18, 20, 22 and 24, the value of capacitor 27 and the "Q" of the windings. In the particular arrangement shown in Figure 4, these constants are so selected that the voltage drop across the series connected windings in the capacitor phase is approximately twice the line voltage. It is apparent that, in order for the voltage across the capacitor phase windings to assume a greater value than the line voltage, the "Q," or ratio of reactance to resistance, must be greater than unity. It is to be kept in mind, however, that this is in obtaining a capacitor phase current substantially in quadrature with the current in a line phase having the same ratio of inductive reactance to resistance as the capacitor phase; in other words, as noted hereinbefore, the windings are identical throughout. As a result, the voltage drop across each of the windings 20, 18, 24, and 22 is equal to exactly one-half of the line voltage. As previously noted this is the voltage drop which occurs across individual windings of the main phase. Thus, the voltage drop across each of the windings of the motor is the same despite the presence of capacitor 27. The windings can accordingly each have exactly the same number of turns and the same resistance and yet result in an arrangement in which the voltage drop per turn is substantially equal throughout the motor. This, as previously noted, is desirable if the field is to approach a circular revolving field.

It will be seen from the above discussion that with my arrangement, it is possible to employ windings which are uniform throughout, both as to the number of turns and their resistance, regardless of whether the windings are in the capacitor or main phases. Furthermore, in spite of using windings of a uniform number of turns, I obtain a motor in which the voltage drop per turn is uniform throughout the field structure.

While I have shown in Figure 4 a special case in which the voltage across the capacitor winding is twice that of the line voltage, it is to be understood that the circuit constants may be so selected that the voltage across the capacitor windings is some other multiple of the line voltage. In such a case, the windings of the main phase can be readily re-connected in series-parallel and still provide a uniform voltage drop across each of the windings of the main and capacitor phases. In general, it is to be understood that my invention is not to be restricted to the embodiments shown but rather as provided by the appended claims.

I claim as my invention:

1. A split phase induction motor, comprising in combination, a rotor and a stator, a plurality of windings each having an equal number of turns and equal resistance in which the ratio of the inductive reactance to resistance is greater than unity, a first and second group of said windings being electrically displaced from one another on said stator to provide a flux field therein when energized, said first group of said windings being permanently connected in parallel, and said second group of said windings being permanently connected in series with each other and with a capacitor to provide a condition of resonance within said second group of windings and said capacitor causing a substantially equal voltage drop per winding and a nearly circular flux field within said stator.

2. A split phase induction motor comprising, a rotor, a stator, said stator including a first group of windings electrically displaced from a second group of windings to provide a rotating flux field within said stator when energized, each of said windings having an equal number of turns and equal resistance within the inductive reactance to resistance ratio for said windings greater than unity, said first group of windings being permanently connected in series-parallel, and said second group of windings being permanently connected in series with each other and with a capacitor to provide a condition of resonance therein causing a substantially equal voltage drop across each of said windings of both groups and substantial circularity of said flux field within said stator.

3. A split phase induction motor of the capacitor type having in combination, a rotor, a capacitor, a stator comprising a plurality of line phase windings and capacitor phase windings each of which has an equal number of turns and an equal resistance with an inductive reactance to resistance ratio greater than unity, said windings of said capacitor and line phases being electrically displaced from one another, said line phase windings being permanently connected in series-parallel, and said capacitor phase windings being permanently connected in series with one another and with said capacitor the optimum value of which provides a condition of resonance within said capacitor phase and a substantially equal voltage drop per winding.

4. An induction motor operating from a single phase source, comprising, a rotor, a stator, said stator having a first group of windings electrically displaced from a second group of windings, each of said windings having an equal number of turns and an equal resistance with an inductive reactance to resistance ratio greater than unity, said first group of windings being connected in parallel, said second group of windings being connected in series with each other and with a capacitor whose value is such to provide a condition of resonance within said second group of said windings so that the voltage drop per winding is substantially equal.

EDGAR M. SMITH.

REFERENCES CITED

The following references are of record in the file of this patent:

UNITED STATES PATENTS

| Number | Name | Date |
|--------|------|------|
| 808,303 | Palmer | Dec. 26, 1905 |
| 1,780,881 | Kennedy | Nov. 4, 1930 |
| 1,886,895 | Myers | Nov. 8, 1932 |